United States Patent [19]

Hahn et al.

[11] Patent Number: 5,145,878
[45] Date of Patent: Sep. 8, 1992

[54] DRYING OF FINELY DIVIDED, EXPANDABLE STYRENE POLYMERS

[76] Inventors: Klaus Hahn, 9 Im Buegen, 6719 Kirchheim; Matthias Dietrich, 1 Duerrestrasse, 6940 Weinheim, both of Fed. Rep. of Germany

[21] Appl. No.: 833,179

[22] Filed: Feb. 10, 1992

[30] Foreign Application Priority Data

Feb. 14, 1991 [DE] Fed. Rep. of Germany ....... 4104418

[51] Int. Cl.$^5$ .......................... C08J 9/22; C08J 9/224
[52] U.S. Cl. ....................................... 521/60; 521/56; 521/57; 521/59; 521/146
[58] Field of Search ................ 521/56, 60, 146, 57, 521/59

[56] References Cited

U.S. PATENT DOCUMENTS

| | | | |
|---|---|---|---|
| 4,513,105 | 4/1985 | Hahn et al. | 521/56 |
| 4,520,135 | 5/1985 | Hahn et al. | 521/56 |
| 4,525,484 | 6/1985 | Hahn et al. | 521/56 |
| 4,569,949 | 2/1986 | Brenner | 521/60 |
| 4,579,872 | 4/1986 | Johnson | 521/60 |
| 4,681,779 | 7/1987 | Ingram | 521/60 |
| 4,983,639 | 1/1991 | Hahn et al. | 521/59 |
| 4,990,540 | 2/1991 | Hahn et al. | 521/56 |

FOREIGN PATENT DOCUMENTS

| | | |
|---|---|---|
| 2008921 | 8/1990 | Canada . |
| 2016587 | 12/1990 | Canada . |
| 2020287 | 1/1991 | Canada . |
| 3915602 | 10/1991 | Fed. Rep. of Germany . |

*Primary Examiner*—Morton Foelak
*Attorney, Agent, or Firm*—Keil & Weinkauf

[57] ABSTRACT

In order to dry finely divided, expandable styrene polymers having a particle size of from 0.02 to 3 mm, the bead polymers, in the form of a slurry in water, are freed from the majority of the water and subsequently exposed to a gaseous medium. The drying is carried out in two steps, by jointly conveying the bead polymer and a first gas stream, warmed to from about 45° to 120° C., through a flow dryer, the ratio between the gas and the bead polymer being from 2 to 40 kg/kg, separating the bead polymer from the first gas stream, immediately transferring the bead polymer into a fluidized bed and treating the polymer with a second gas stream at from about 0° to 75° C. Styrene polymers obtained in this way are free-flowing and can be foamed without difficulty in commercially available prefoaming units. They are used, inter alia, in the construction industry, for example as aggregate for insulation plaster.

6 Claims, 1 Drawing Sheet

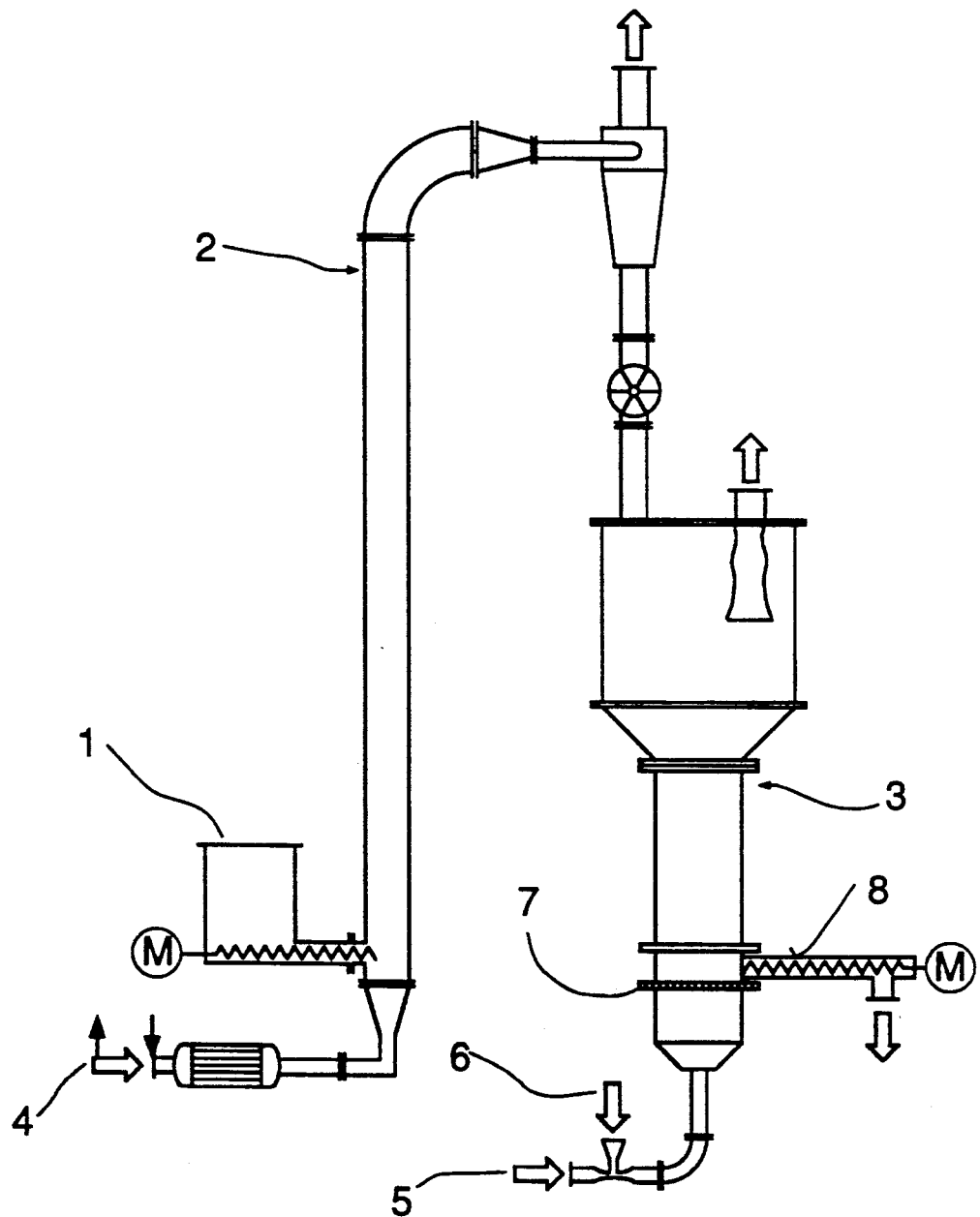

DRYING OF FINELY DIVIDED, EXPANDABLE STYRENE POLYMERS

BACKGROUND OF THE INVENTION

Expandable styrene polymers are prepared on an industrial scale by the suspension polymerization of styrene in water. The bead polymer obtained after separation of the aqueous phase usually has a bead size of from 0.3 to 3 mm. In order to increase the yield, a decanter can be used to remove extremely fine polymer particles ($\leq 0.3$ mm), known as decanter material, from the suspension effluent. However, since these products have a total water content of from 1 to 10% by weight (surface water and internal water), the decanter material has hitherto exclusively been fed back into the preparation process as redissolver. The development of a saleable grade prepared therefrom has hitherto foundered on the work-up, in particular the drying, of such products since, even after removal of the surface moisture, internal water is released by the beads and results in unsatisfactory flow properties of the decanter material. As a consequence, agglomerates are formed, in particular on storage of the products, which makes conversion of the styrene polymers into foams considerably more difficult.

SUMMARY OF THE INVENTION

It is an object of the present invention to provide a process which is suitable, in particular, for the drying of finely divided, expandable styrene polymers having a particle size of from 0.02 to 0.3 mm and in which the bead polymer particles can be provided with a surface coating during drying.

In the process, the polymer beads are dried by jointly conveying the bead polymer and a first gas stream, warmed to from about 45° to 120° C., through a flow dryer, the ratio between the gas and the bead polymer being from 2 to 40 kg/kg, separating the bead polymer from the first gas stream, immediately transferring the bead polymer into a fluidized bed, and, with the aid of a second gas stream, cooling the polymer to from about 0° to 75° C. and drying the polymer.

DESCRIPTION OF THE PREFERRED EMBODIMENTS

The principal component in the finely divided, expandable products is polystyrene and/or a styrene copolymer containing at least 50% by weight, preferably at least 80% by weight, of copolymerized polystyrene. Examples of the copolymers employed are α-methylstyrene, ring-halogenated styrenes, ring-alkylated styrenes, acrylonitrile, esters of acrylic or methylacrylic acid with alcohol shaving 1 to 8 carbon atoms, N-vinylcarbazol, maleic acid and maleic anhydride.

The polystyrene may advantageously contain small amounts of a copolymerized chain-branching agent, i.e. a compound containing more than one, preferably two, double bonds, such as divinylbenzene, butadiene or butanediol diacrylate. The branching agent is generally employed in amounts of from 0.001 to 0.05 mol %, based on styrene.

In general, styrene polymers having a molecular weight and molecular weight distribution as described in EP-B-106 129 and DE-A 39 21 148 are used. It is also possible to use mixtures of different styrene polymers, as described, for example, in DE-A 39 01 329, 39 08 238 and 39 15 602.

The blowing agents present in the expandable styrene polymers contain from 0.5 to 10% by weight, preferably from 3 to 8% by weight, based on the styrene polymer, of a $C_3$- to $C_6$-hydrocarbon, such as propane, n-butane, isobutane, n-pentane, isopentane, neopentane and/or hexane. Preference is given to a pentane isomer mixture.

The expandable styrene polymers may additionally contain assistants, such as pigments, dyes, stabilizers, fillers, flameproofing agents, synergists, nucleating agents, lubricants and the like, in conventional effective amounts.

Other suitable additives are poly-(2,6-dimethyl)-1,4-phenyleneether and poly-1,4-phenylene sulfide, as described in DE-A 39 04 370 and DE-A 39 24 868. These additives increase the heat resistance of the foams. Other suitable additives are styrene-soluble elastomers, as described in DE-A 39 15 602, which increase the elasticity of the foam.

The expandable styrene polymers are generally in bead form with a mean bead diameter of from 0.02 to 0.3 mm, in particular from 0.05 to 0.2 mm. They are prepared by polymerizing styrene, if desired with addition of further comonomers, in aqueous suspension in the presence of a conventional suspension stabilizer and in the presence of initiators which form free radicals.

It is advantageous to add a regulator and/or a chain-branching agent during the polymerization, for example in amounts of from 0.001 to 3% by weight, based on styrene. The blowing agent and any additives may be introduced before commencing the polymerization or added to the batch during or after the polymerization. When the polymerization is complete, the bead-form styrene polymers obtained, having a bead size of from 0.3 to 3 mm, are separated from the aqueous phase, washed, dried and, if desired, coated, in each case by conventional methods.

The polymer particles in the suspension effluent are subsequently freed from the majority of the water with the aid of a decanter, and the bead polymers having a bead size of from 0.02 to 0.3 mm are dried using a gaseous medium. The drying according to the invention is carried out in two steps; in the first step, the surface moisture is essentially removed, and then, in the second step, the moisture content of the bead polymers is reduced to residual levels of less than 0.25%, in particular less than 0.15%. To this end, the bead polymer and a first gas stream, expediently warmed to from 45° to 120° C., and advantageously to from 70° to 100° C., are jointly conveyed through a flow dryer, for example a riser pipe. Overall, it has proven favorable for the ratio between the gas and the bead polymer to be from 2 to 40 kg/kg, in particular from 4 to 10 kg/kg. Flow rates for the first gas stream of from about 4 to 30 m/sec give residence times of the polystyrene in the flow dryer in the region of seconds.

The bead polymer is separated from the first gas stream at the outlet of the flow dryer and is immediately transferred into a fluidized bed, where, in a second step, the drying to the desired residual moisture content takes place. This is accomplished using a second gas stream, which is preferably fed in countercurrent to the bead polymer. This second gas stream is generally at from 0° to 75° C., expediently at from 15° to 60° C., and has a flow rate of from about 0.05 to 2 m/sec. These conditions give a residence time of the bead polymer in the fluidized bed of from 1 to 30 minutes.

Suitable gaseous media for drying the bead polymers are air and nitrogen; in a particularly preferred procedure, air is used in the first drying step and nitrogen in the second.

According to a further feature of the invention, a coating composition for the bead polymer is introduced into the fluidized bed together with the second gas stream. Either liquid or pulverulent coating compositions can be metered in. Examples of suitable coating compositions are antistatics and substances which have an antiadhesive effect during prefoaming, such as metal stearates, metal carbonates, metal oxides, finely divided silicas ($SiO_2$) or glycerol esters. The proportion of the coating composition is from 0.1 to 3% by weight, preferably from 0.5 to 1.5% by weight, in particular from 0.7 to 1.2% by weight. The coating composition is metered in during the drying in the flow dryer and/or fluidized bed.

Styrene polymers obtained in this way are free-flowing and can be foamed without difficulty in commercially available prefoaming units. Foam particles produced therefrom generally have a density of from about 0.01 to about 0.1 g/cm$^3$ and are used, inter alia, in the construction industry, for example as aggregate for insulation plaster.

BRIEF DESCRIPTION OF THE DRAWINGS

The figure is a schematic representation of the apparatus used for carrying out the process of this invention.

The invention is described in greater detail below by means of a working example and with reference to the drawing. In the example, parts are by weight.

A mixture of 150 parts of water, 0.1 part of sodium pyrophosphate, 100 parts of styrene, 0.45 part of dibenzoyl peroxide, 0.15 part of tert-butyl perbenzoate and 7 parts of pentane was heated to 90° C. with stirring in a pressure-tight stirred reactor. After 2 hours at 90° C., 4 parts of a 10% strength aqueous solution of polyvinylpyrrolidone were added as suspension stabilizer. The mixture was then stirred at 90° C. for 2 hours, subsequently at 100° C. for 2 hours and finally at 120° C. for 2 hours. After the mixture had been cooled to room temperature, the bead polymer having a particle diameter of from 0.3 to 3 mm was first separated off.

Extremely fine polymer particles having a particle size of from 0.04 to 0.3 mm were subsequently isolated from the suspension effluent using a decanter (1). The overall moisture content of this decanter material was about 4% by weight. After the surface water had been removed by means of a flow dryer (2), the products were dried in a fluidized bed (3) and coated with metal stearates. During this operation, a first gas stream was fed into the flow dryer at (4) and a second gas stream was fed into the fluidized bed at (5). The metal stearates for coating the bead polymers were introduced at (6).

The cooled and dried bead polymer was discharged above the fluidized bed base (7) with the aid of a screw (8).

The experimental conditions are shown in the table.

TABLE

|  |  |  | Experimental conditions |
|---|---|---|---|
| Flow dryer | Product inlet temperature | °C. | 20 |
|  | Product inlet moisture content (water) | % | 4 |
|  | Product outlet moisture content (water) | % | 0.2 |
|  | Ratio: 1st Gas stream/ product stream | kg/kg | 6 |
|  | Gas inlet temperature | °C. | 75 |
|  | Gas type | — | Air |
| Fluidized bed | Product inlet temperature | °C. | 50 |
|  | Product inlet moisture content (water) | kg/kg | 0.2 |
|  | Product outlet moisture content (water) | kg/kg | 0.1 |
|  | Ratio: 2nd Gas stream/ product stream | kg/kg | 0.3 |
|  | Gas inlet temperature | °C. | 20 |
|  | Gas flow rate (fluidized bed) | m/s | 0.3 |
|  | Gas type | — | Nitrogen |
|  | Coating with solids | — | Yes |
|  | Coating with liquids | — | Yes |

We claim:

1. A process for the drying of a finely divided, expandable styrene polymer having a particle size of from 0.02 to 0.3 mm, in which the bead polymer, in the form of a slurry in water, is freed from the majority of the water and dried with the aid of a gaseous medium, which comprises jointly conveying the bead polymer and a first gas stream, warmed to from about 45° to 120° C., through a flow dryer, the ratio between the gas and the bead polymer being from 2 to 40 kg/kg, separating the bead polymer from the first gas stream, immediately transferring the bead polymer into a fluidized bed, and, with the aid of a second gas stream, cooling the polymer to from about 0° to 75° C. and drying the polymer.

2. A process as claimed in claim 1, wherein the flow rate of the first gas stream in the flow dryer is from about 4 to 30 m/sec.

3. A process as claimed in claim 1, wherein the flow rate of the second gas stream in the fluidized bed is from about 0.05 to 2 m/sec.

4. A process as claimed in claim 1, wherein the gaseous medium used is air or nitrogen.

5. A process as claimed in claim 1 wherein a coating composition for the bead polymer is introduced into the fluidized bed.

6. A process as claimed in claim 5, wherein the coating composition is a liquid and/or pulverulent antiadhesive.

* * * * *